US005564512A

United States Patent [19]

Scheulderman

[11] Patent Number: 5,564,512

[45] Date of Patent: Oct. 15, 1996

[54] WHEELCHAIR

[75] Inventor: Petrus J. Scheulderman, Almere, Netherlands

[73] Assignee: Richard van Seenus Nederland B.V., Netherlands

[21] Appl. No.: 284,614

[22] PCT Filed: Dec. 17, 1993

[86] PCT No.: PCT/NL93/00268

§ 371 Date: Aug. 10, 1994

§ 102(e) Date: Aug. 10, 1994

[87] PCT Pub. No.: WO94/13241

PCT Pub. Date: Jun. 23, 1994

[30] Foreign Application Priority Data

Dec. 17, 1992 [NL] Netherlands ............................ 9202183

[51] Int. Cl.[6] ..................................................... B60K 1/00

[52] U.S. Cl. ..................... 180/65.5; 180/907; 280/304.1; 280/767

[58] Field of Search ............................. 280/250.1, 304.1, 280/293, 47.12, 47.41, 149.2, 755, 763.1, 767, 724, 240; 180/65.1, 65.5, 907

[56] References Cited

U.S. PATENT DOCUMENTS

| | | | |
|---|---|---|---|
| 1,138,181 | 5/1915 | Bock | 280/724 |
| 4,830,567 | 5/1989 | Rachman | 280/304.1 |
| 4,861,056 | 8/1989 | Duffy, Jr. et al. | 280/250.1 |
| 4,898,256 | 2/1990 | Lehner | 180/907 |
| 5,046,571 | 9/1991 | Kullerud | 280/640 |
| 5,137,295 | 8/1992 | Peek | 280/250.1 |
| 5,222,567 | 6/1993 | Broadhead et al. | 180/65.1 |
| 5,305,845 | 4/1994 | Van Dooren | 180/65.1 |

FOREIGN PATENT DOCUMENTS

| | | | |
|---|---|---|---|
| 0339500 | 11/1989 | European Pat. Off. | 180/907 |
| 0512650A1 | 11/1992 | European Pat. Off. . | |
| 2354211 | 1/1978 | France . | |
| 9012188 | 10/1990 | Germany . | |

*Primary Examiner*—Anne Marie Boehler

*Attorney, Agent, or Firm*—Westman, Champlin & Kelly, P.A.

[57] ABSTRACT

A wheelchair comprises a base frame section with a longitudinal rod carrying at its ends a front wheel and a back wheel, respectively, and a seat frame section for supporting a seat and a back rest. Each back wheel is mounted in a wheel carrier pivotably connected with the corresponding longitudinal rod, wherein a spring is provided between the wheel carrier and the longitudinal rod, the spring extending substantially parallel with the longitudinal rod. Each spring is preferably located below the corresponding longitudinal rod. In this manner the wheelchair described is provided with an elastic back wheel suspension, wherein a compact construction is obtained by the location of the spring.

13 Claims, 2 Drawing Sheets

WHEELCHAIR

The invention relates to a wheelchair, comprising a base frame section with a longitudinal rod carrying at its ends a front wheel and a back wheel, respectively, and a seat frame section for supporting a seat and a back rest.

Such a wheelchair is described in U.S. Pat. No. 5,240,277.

The invention aims to provide a wheelchair of this type providing the user more comfort and which is also suitable for mounting an electrical drive.

To this end the wheelchair according to the invention is characterized in that each back wheel is mounted in a wheel carrier pivotably connected with the corresponding longitudinal rod, wherein a spring means is provided between the wheel carrier and the longitudinal rod, said spring means extending substantially parallel with the longitudinal rod.

In this manner a wheelchair is obtained which is provided with an elastic back wheel suspension, wherein a compact construction is obtained by the location of the spring means.

An electrical drive is simply possible if an electric motor is mounted in each wheel carrier, the shaft of said motor carrying the back wheel.

The invention will be further explained by reference to the drawings in which an embodiment is very schematically shown.

Figure 1:
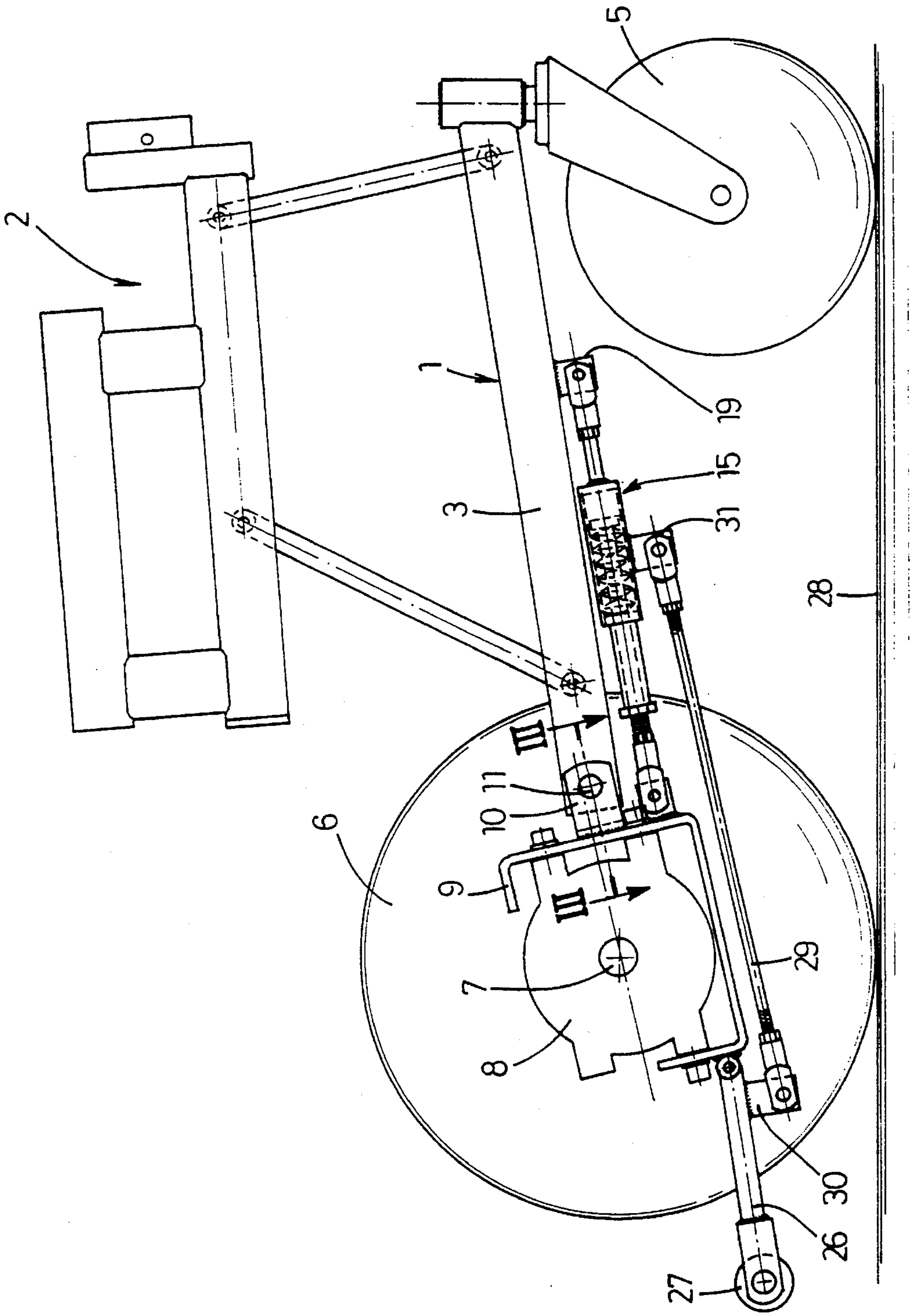
FIG. 1 is a section of a part of an embodiment of the wheelchair according to the invention.

Referring to the drawings there is schematically shown a wheelchair mainly made in the same manner as the wheelchair according to U.S. Pat. No. 5,240,277 and reference is made to this document for a detailed description of the construction of this wheelchair.

The wheelchair comprises a base frame section 1 and a seat frame section 2 for supporting a seat not shown and a back rest neither shown, The base frame section 1 is provided at both sides with a longitudinal rod 3 and 4, respectively, consisting of an oval tube. Each longitudinal rod carries at its front end a castor wheel 5 and at its rear end a back wheel 6. The back wheel 6 is mounted on the shaft 7 of an electric motor 8 not further shown and known per se.

The electric motor 8 is mounted in a wheel carrier 9 pivotably connected with the corresponding longitudinal rod 3, 4 by means of a U-shaped brace 10. To this end the legs of the U-shaped brace 10 are mounted on a shaft 11 rotatably received in a bushing 12 mounted on the longitudinal rod 3, 4 and in the longitudinal rod 3, 4 itself. The U-shaped brace 10 is fastened on the shaft 11 by a lock bolt 13 which engages for example in a circumferential groove of the shaft 11 not shown. Both shafts 11 are coupled with each other by a cylindrical bushing 14, the ends of the shafts 11 directed towards each other being fittingly received in said bushing 14. In this manner the wheel carriers 9 on the one hand can pivot with respect to the base frame section 1 independently of each other, whereas on the other hand a rigid construction of the base frame section 1 is guaranteed.

Each wheel carrier 9 is coupled with the base frame section 1 by means of a spring means 15. This spring means 15 is located below the corresponding longitudinal rod 3, 4 and extends substantially parallel with this longitudinal rod 3, 4. Thereby a very compact construction is obtained.

Figure 2:
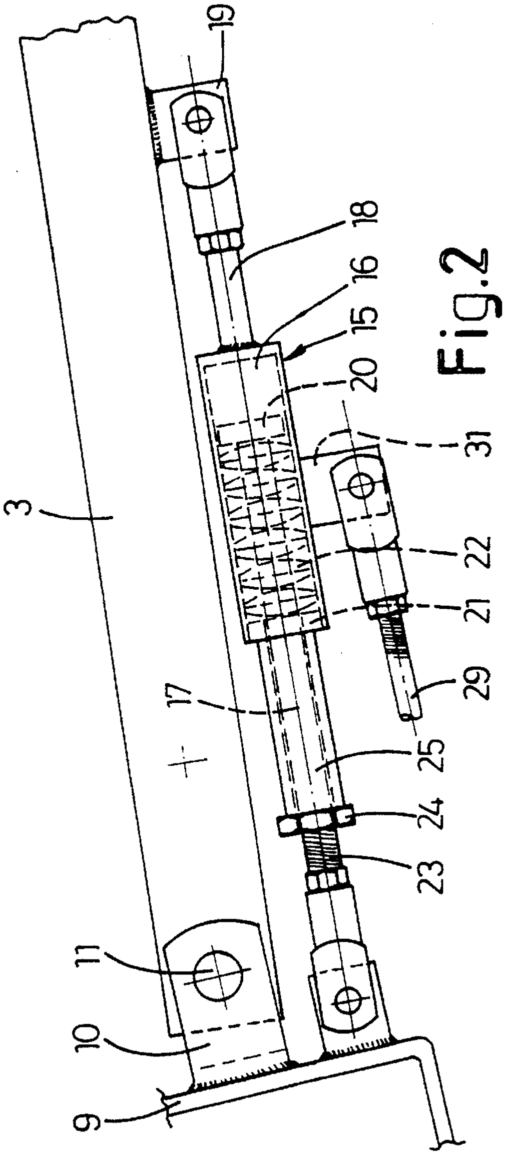
FIG. 2 shows a detail of FIG. 1 at a larger scale.
Figure 3:
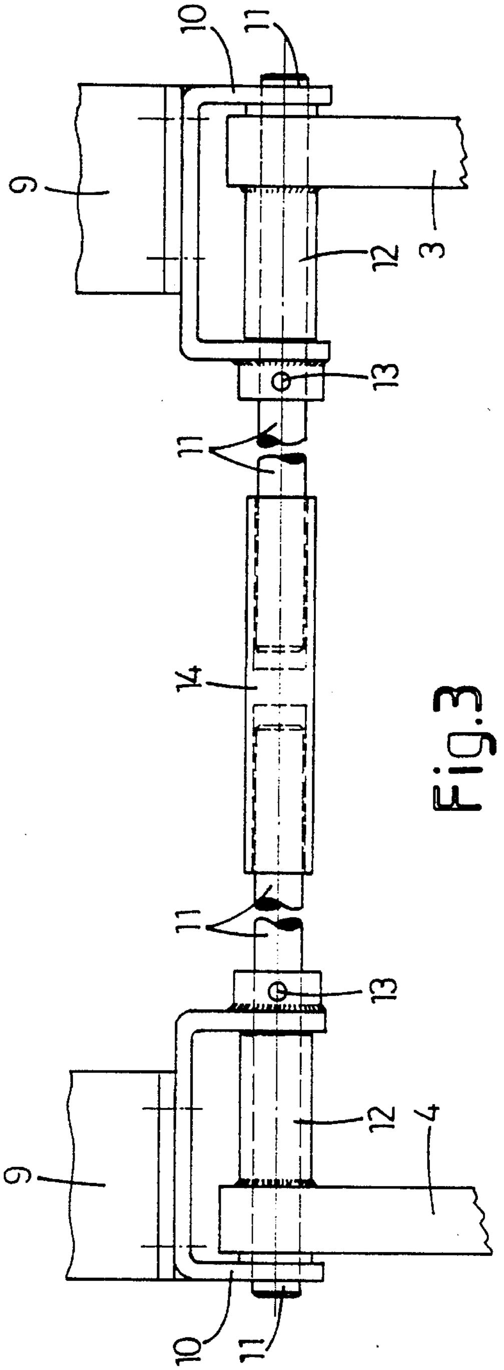
FIG. 3 is a section according to the plane III—III of FIG. 1.

As shown in FIG. 2 in more detail, the spring means 15 comprises a housing 16 and a pulling rod 17, wherein the housing 16 is rotatably connected with a support 19 of the corresponding longitudinal rod 3, 4 by a pin 18, whereas the pulling rod 17 is rotatably connected with the corresponding wheel carrier 9. A head 20 of the pulling rod 17 is slidably mounted in the housing 16, wherein a plurality of diaphragm springs 22 is provided between this head 20 and an end wall 21 of the housing 16. An adjusting nut 24 is provided on a screw thread part 23 of the pulling rod 17, wherein a sleeve 25 is enclosed between the adjusting nut 24 and the end wall 21 of the housing 16. By means of the adjusting nut 24 the rest position of the spring means 15 and thereby the spring bias can be adjusted.

Each wheel carrier 9 is provided with an arm 26 pivotally connected with the same and carrying a safety wheel 27 at its end directed away from the base frame section 1. In the rest position shown in FIG. 1 said safety wheel 27 lies at an adjustable distance from the surface 28 supporting the wheels 5, 6. The arm 26 is coupled with the base frame section 1 by a coupling rod 29. In the embodiment shown the coupling rod 29 is rotatably connected with a support 30 of the arm 26 and a support 31 attached to the housing 16. The length of this coupling rod is adjustable for adjusting the distance between the safety wheel 27 and the surface 28.

If during use of the wheelchair described a back wheel pivots upwardly, the safety wheel 27 will pivot downwardly. Thereby it is obtained that in particular during riding on an oblique surface tilting backwards of the wheelchair is prevented in that the safety wheels 27 will then contact the oblique surface and thereby increase the wheelbase.

Although in the embodiment described the back wheels 6 are driven by electric motors 8, it is of course also possible to apply the construction described in a wheelchair without electrical drive. In that case, each back wheel 6 is connected with an adapted wheel carrier 9 by a shaft.

The invention is not restricted to the above described embodiment which can be varied in a number of ways within the scope of the claims.

I claim:

1. A wheelchair, comprising a base frame section with a longitudinal rod carrying at its ends a front wheel and a back wheel, respectively, and a seat frame section for supporting a seat and a back rest, wherein each back wheel is mounted in a wheel carrier pivotally connected to the corresponding longitudinal rod, and a spring means provided between the wheel carrier and the longitudinal rod, said spring means extending substantially parallel with and below the longitudinal rod, wherein each spring means comprises a housing and a pulling rod with a head slidable in the housing, wherein a plurality of diaphragm springs are provided between an end wall and the head.

2. The wheelchair according to claim 1, wherein each wheel carrier comprises a U-shaped brace having legs mounted on a shaft, said shaft being rotatably mounted in the corresponding longitudinal rod.

3. The wheelchair according to claim 2, wherein each longitudinal rod includes a bushing for receiving the corresponding shaft.

4. The wheelchair according to claim 2, wherein both shafts are coupled with each other by a cylindrical bushing.

5. The wheelchair according to claim 1, and further comprising an arm pivotably connected to each wheel carrier and directed away from the base frame section, each arm carrying a safety wheel at its free end, said safety wheel being located at an adjustable distance from a surface supporting the wheelchair, wherein each arm is connected with the base frame section by a coupling rod.

6. The wheelchair according to claim 5, wherein the coupling rod has an adjustable length.

7. The wheel chair according to claim 1 wherein the pulling rod has a screw thread part wherein the length projecting out of the housing is adjustable by means of a nut rotatably mounted on the screw thread part.

8. The wheelchair according to claim 1, and further comprising an electric motor having a shaft mounted in each wheel carrier, the shaft of said motor carrying the back wheel.

9. A wheelchair, comprising a base frame section with a longitudinal rod carrying at its ends a front wheel and a back wheel, respectively, and a seat frame section for supporting a seat and a back rest, wherein each back wheel is mounted in a wheel carrier pivotally connected to the corresponding longitudinal rod, and a spring means provided between the wheel carrier and the longitudinal rod, said spring means extending substantially parallel with and below the longitudinal rod, wherein each wheel carrier comprises a U-shaped brace having legs mounted on a shaft, said shaft being rotatably mounted in the corresponding longitudinal rod, both shafts being coupled with each other by a cylindrical bushing.

10. The wheelchair according to claim 9, wherein each spring means has an adjustable spring bias.

11. The wheelchair according to claim 9, wherein each longitudinal rod includes a bushing for receiving the corresponding shaft.

12. A wheelchair, comprising a base frame section with a longitudinal rod carrying at its ends a front wheel and a back wheel, respectively, and a seat frame section for supporting a seat and a back rest, wherein each back wheel is mounted in a wheel carrier pivotally connected to the corresponding longitudinal rod, a spring means provided between the wheel carrier and the longitudinal rod, said spring means extending substantially parallel with and below the longitudinal rod, and an arm pivotally connected to each wheel carrier and directed away from the base frame section, each arm carrying a safety wheel at its free end, said safety wheel being located at an adjustable distance from a surface supporting the wheelchair, wherein each arm is connected with the base frame section by a coupling rod.

13. The wheelchair according to claim 12, wherein the coupling rod has an adjustable length.

* * * * *